United States Patent [19]
Buttchen et al.

[11] Patent Number: 5,373,978
[45] Date of Patent: Dec. 20, 1994

[54] CARRIER FOR SPORTING GOODS

[75] Inventors: Brian Buttchen, Mt. Horeb; Kenneth Muderlak, Shorewood, both of Wis.

[73] Assignee: Graber Products, Inc., Madison, Wis.

[21] Appl. No.: 943,907

[22] Filed: Sep. 11, 1992

[51] Int. Cl.$^5$ .............................................. B60R 9/00
[52] U.S. Cl. ...................... 224/42.03 R; 224/42.03 B; 224/42.007
[58] Field of Search .............. 224/420.03 R, 420.03 B, 224/42.07, 42.06, 42.08, 314, 315, 321, 42.45 R; 211/17, 18, 22, 70.5

[56] References Cited

U.S. PATENT DOCUMENTS

| | | | |
|---|---|---|---|
| 2,802,612 | 8/1957 | Barcafer | 224/42.08 |
| 3,796,333 | 3/1974 | Goldstein | 214/450 |
| 4,089,448 | 5/1978 | Traeger | 224/42.03 B |
| 4,125,214 | 11/1978 | Penn | 224/42.08 |
| 4,189,074 | 2/1980 | Davies | 224/42.06 |
| 4,332,337 | 6/1982 | Kosecoff | 224/42.03 B |
| 4,381,069 | 4/1983 | Kreck | 224/42.08 |
| 4,400,129 | 8/1983 | Eisenberg et al. | 224/42.03 R |
| 4,461,410 | 7/1984 | Tartaglia | 224/42.03 B |
| 4,676,414 | 6/1987 | Deguevara | 224/42.03 R |
| 4,785,980 | 11/1988 | Redick | 224/42.07 |
| 4,856,686 | 8/1989 | Workentine | 224/42.07 |
| 4,875,608 | 10/1989 | Graber | 224/42.03 B |
| 5,067,641 | 11/1991 | Johnson et al. | 224/42.03 R |
| 5,094,373 | 3/1992 | Lovei | 224/42.08 |
| 5,121,862 | 6/1992 | Schmidt | 224/42.03 B |
| 5,169,042 | 12/1992 | Ching | 224/42.03 B |
| 5,190,195 | 3/1993 | Fullhart et al. | 224/42.03 B |
| 5,232,134 | 8/1993 | Allen | 224/42.03 B |

FOREIGN PATENT DOCUMENTS

| | | | |
|---|---|---|---|
| 148495 | 1/1937 | Austria | 224/42.03 R |
| 2182619A | 11/1985 | United Kingdom . | |

OTHER PUBLICATIONS

Valley Industries "Transporter Bike Carrying System", p. 327.

Primary Examiner—Henry J. Recla
Assistant Examiner—David J. Walczak
Attorney, Agent, or Firm—Willian Brinks Hofer Gilson & Lione

[57] ABSTRACT

A carrier attachment for a motor vehicle adapted to transport sporting goods such as bicycles or skis on the rear portion of a vehicle, including a frame that supports a plurality of projecting parallel arms. A pair of the arms is positioned in a first plane above the ground, and a third arm is located between the two arms in a plane parallel to and below the first plane. Preferably each of the arms is provided with an encircling layer of cushioning material having surface indentations to receive an article to be transported, and the cushioning layer on at least one of the arms of the upper pair of arms has a flat planar surface portion, and the cushioning layer on the lower arm has a flat plane surface alignable with the first mentioned planar surface so that a flat elongated article such as a ski can be transported in contact with both of the flat planar surface portions. The attachment can be mounted in a trailer hitch receiver tube by means of a bar of rectangular crosssection. Preferably the arms are carried by a vertically oriented member pivotally attached to the rectangular bar, and is releasably locked in the vertically position. The releasable lock means includes a spring biased pin that biased into registry with a locking detent carried by the bar.

4 Claims, 6 Drawing Sheets

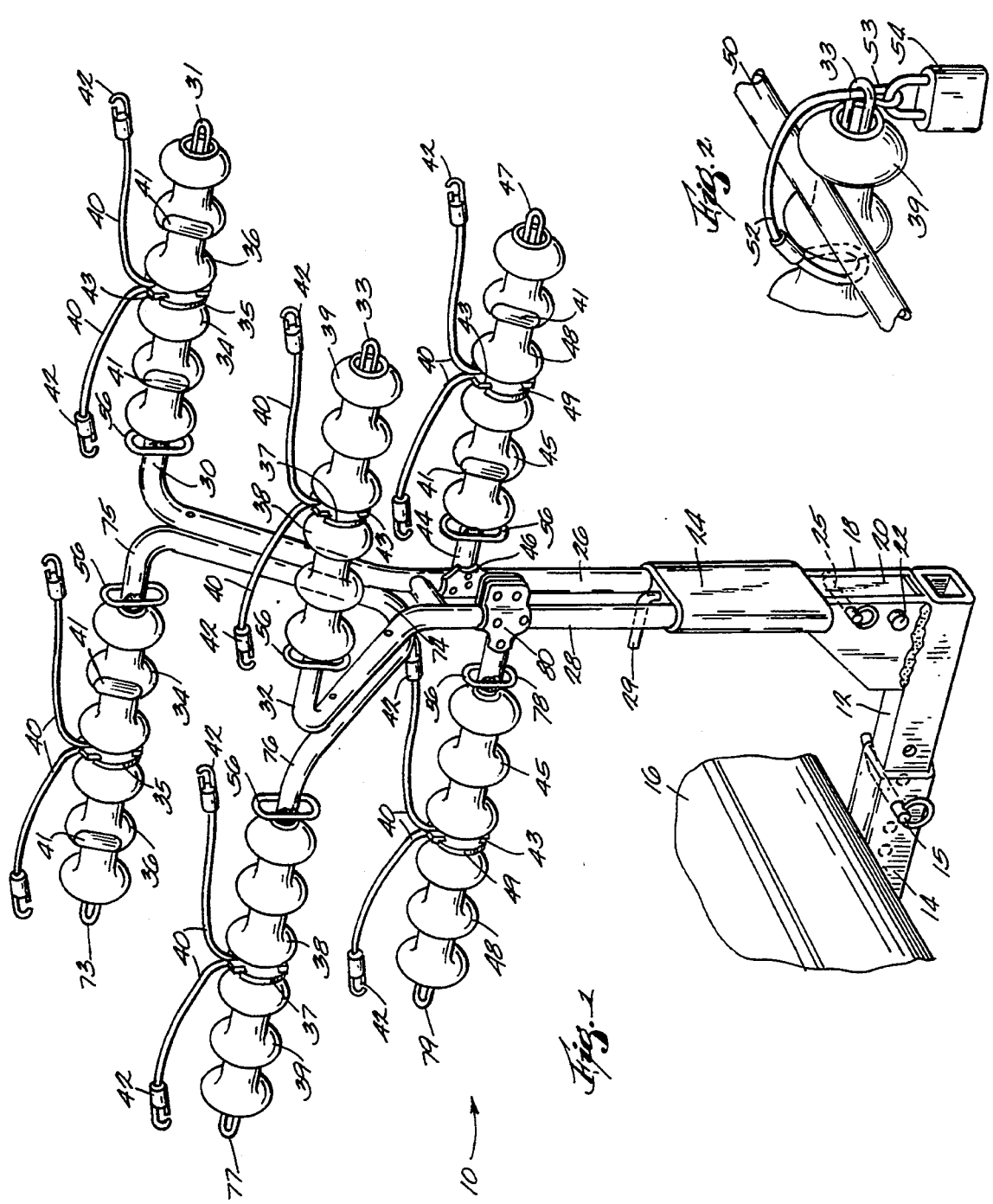

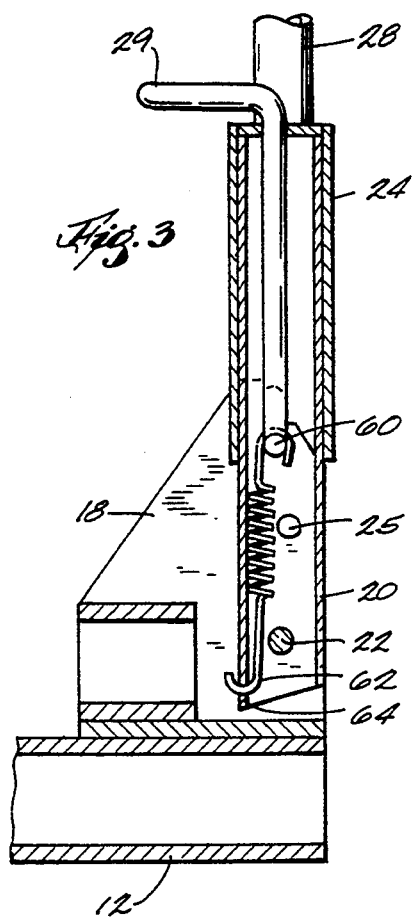
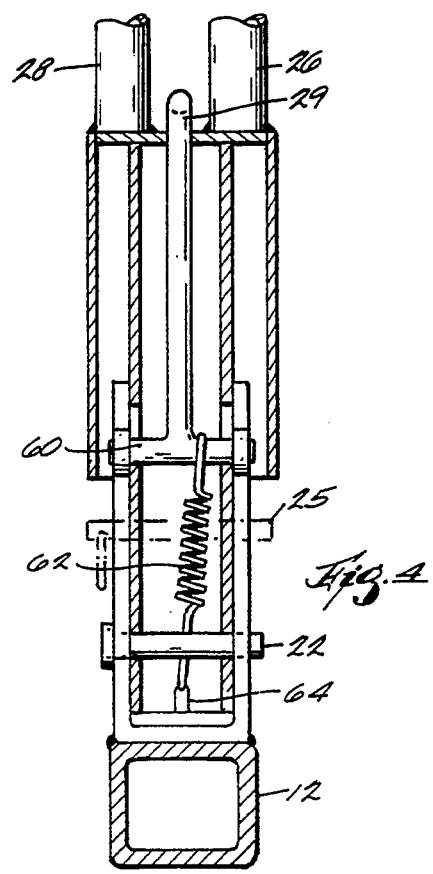
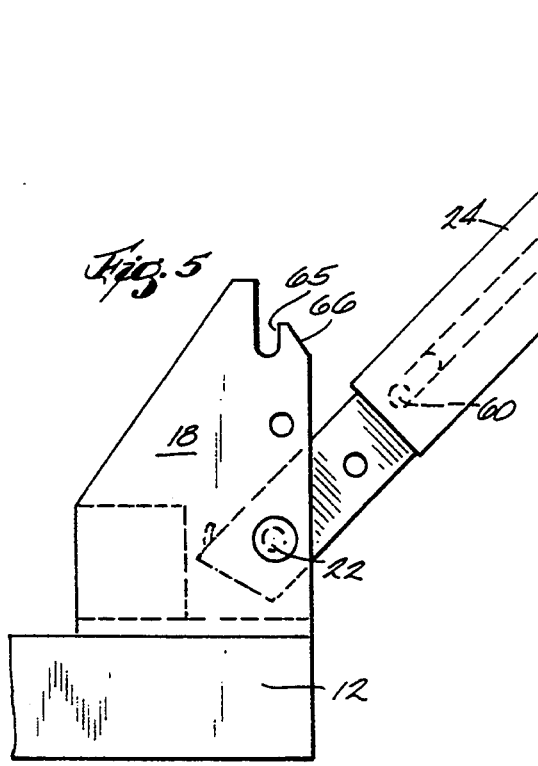
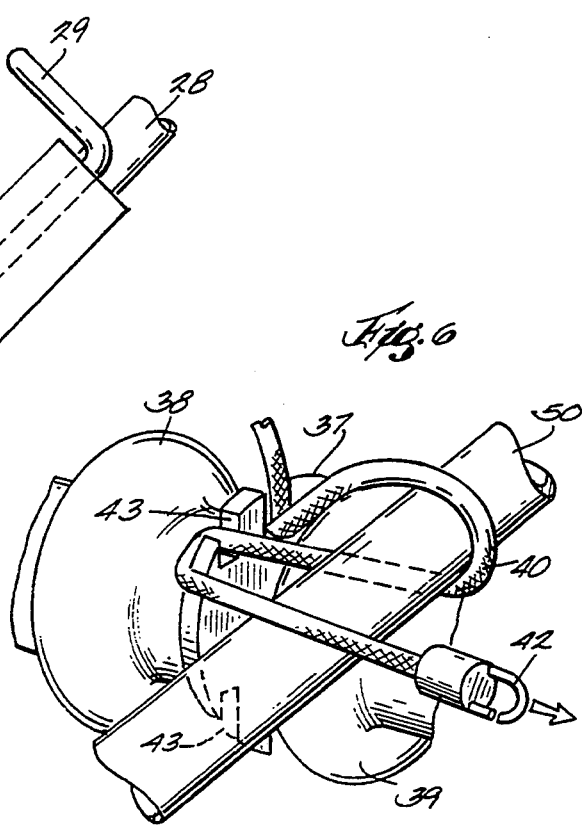

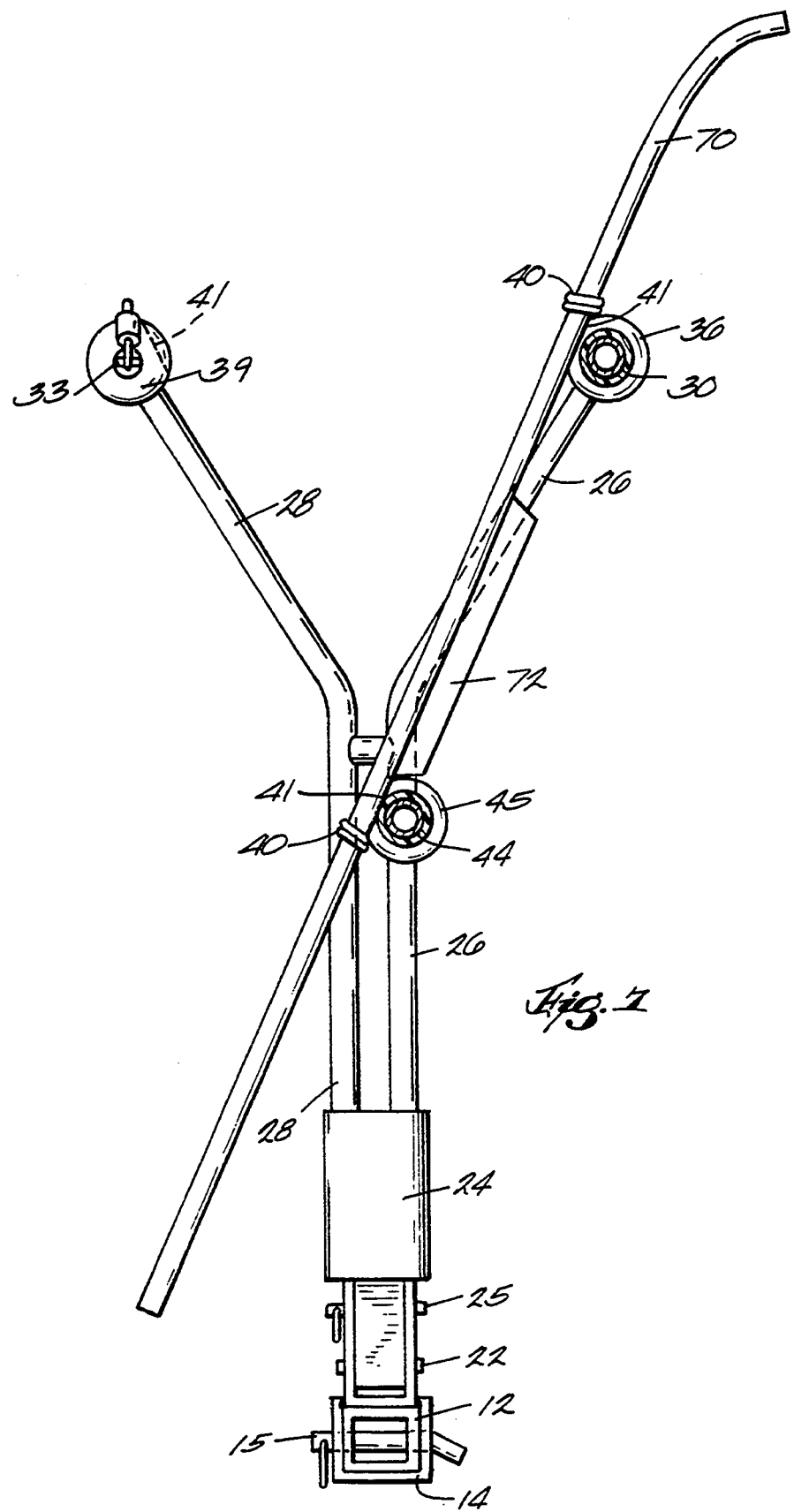

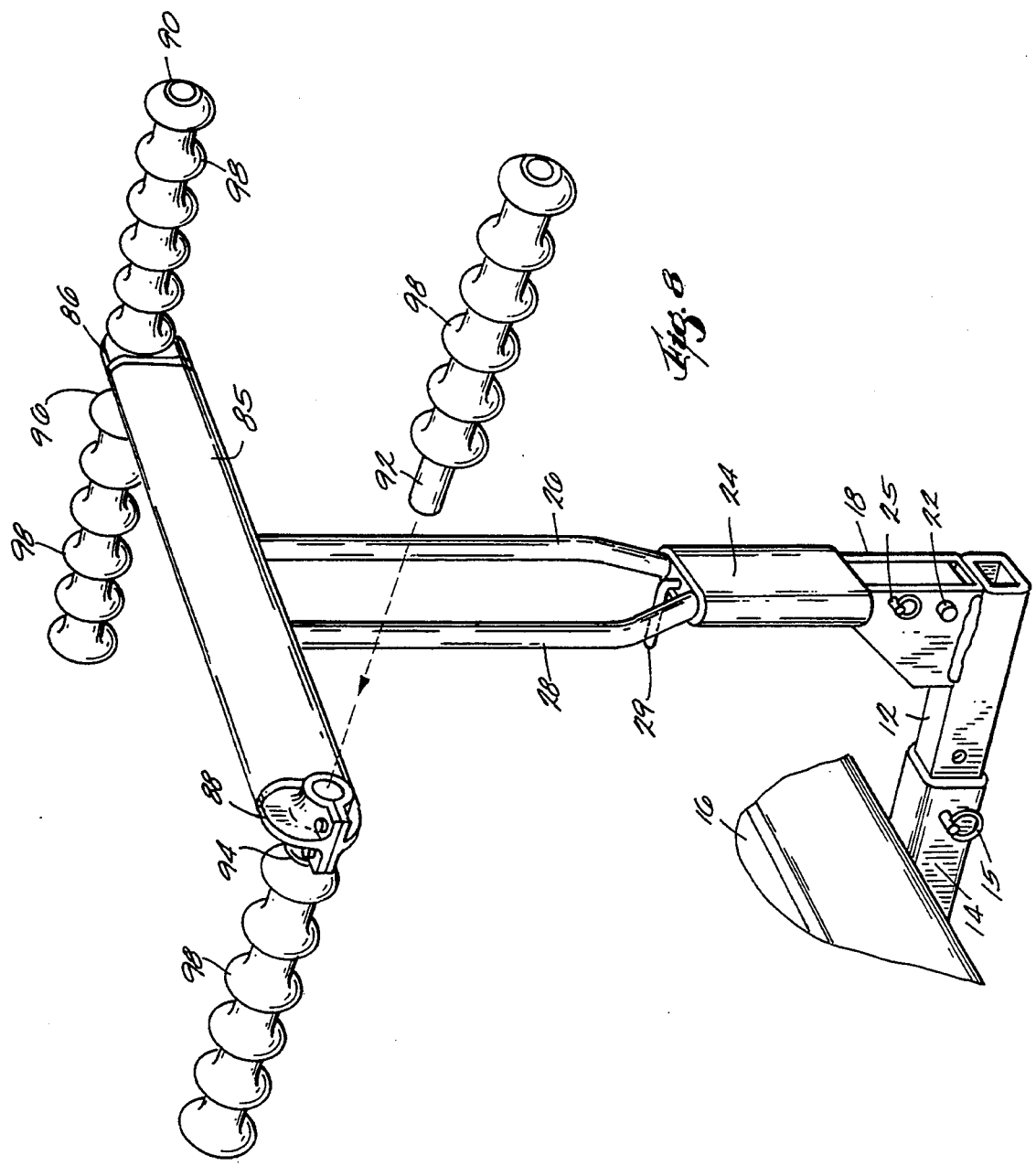

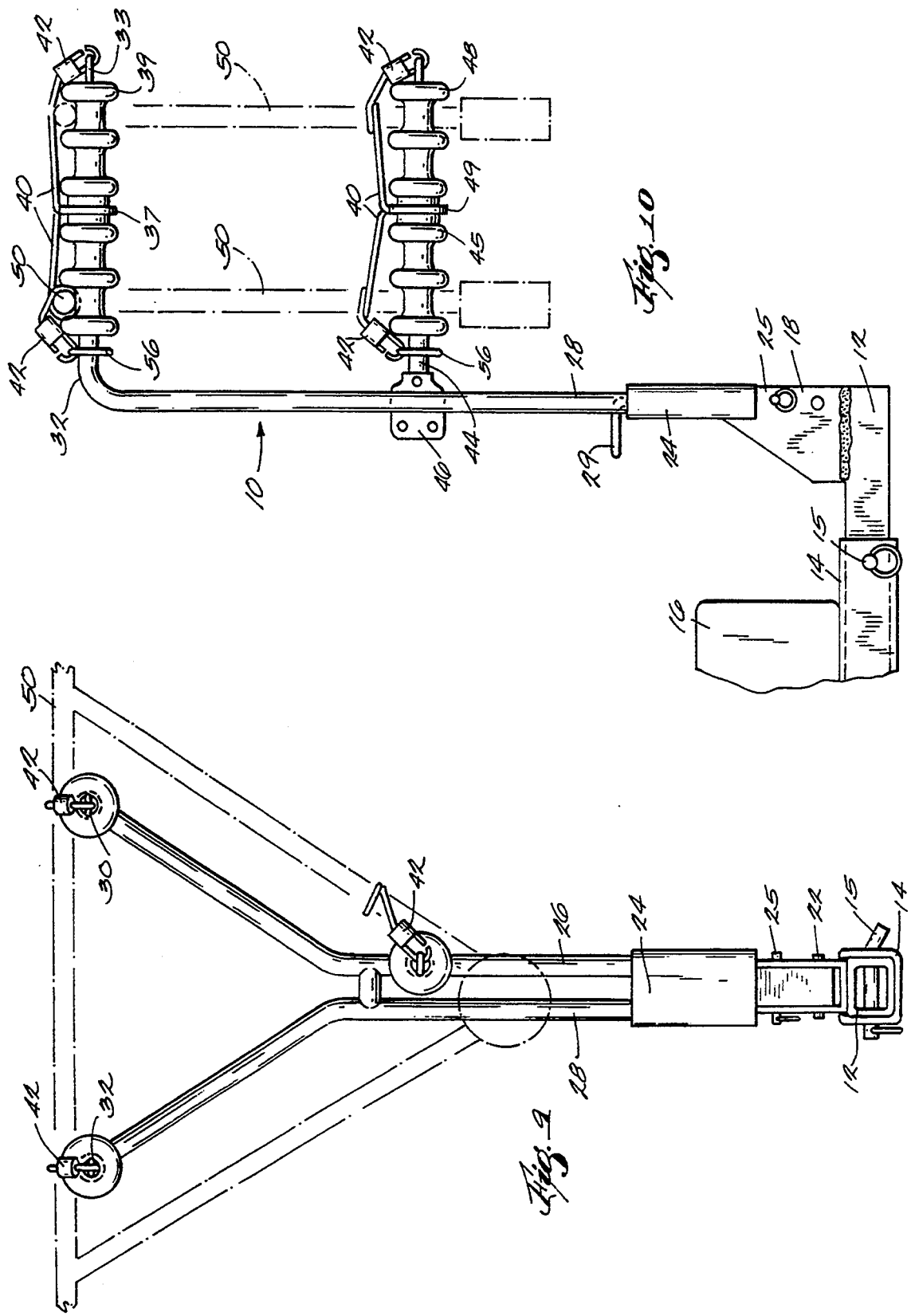

CARRIER FOR SPORTING GOODS

FIELD OF THE INVENTION

This invention relates to carriers for sporting goods such as bicycles and skis mounted on the rear of a vehicle. More specifically, the invention relates to such carriers having improved means for mounting articles on the carrier and to a mechanism for pivoting such a carrier out of the way of the rear of a motor vehicle such as a minivan or station wagon.

BACKGROUND OF THE INVENTION

Carriers for recreational equipment such as bicycles and skis have heretofore been attached in various ways to the rear of a motor vehicle. For example, in accordance with U.S. Pat. No. 2,220,292 granted Nov. 5, 1940, a carrier was clamped around an older style automotive bumper. Such carriers have also either been secured through a ball attachment aperture in a trailer hitch in accordance with U.S. Pat. No. 4,461,410 granted Jul. 24, 1984; inserted into a tubular trailer hitch receiver, U.S. Pat. No. 4,676,414 granted Jun. 30, 1987; or clamped around a ball attached to a trailer hitch, French Patent 2,623,760 published Jun. 2, 1989. A further proposal has been to attach cargo supporting arms on a rotatable shaft. See U.S. Pat. No. 4,856,686 granted Aug. 15, 1989. Other types of carriers have provided for pivoting of a support from side-to-side (U.S. Pat. No. 4,381,069 granted Apr. 26, 1983); front-to-back (U.S. Pat. No. 4,400,129 granted Aug. 23, 1983); or have provided with means to swing the rack away from the rear of the vehicle around the vertical axis (U.S. Pat. No. 5,094,373 granted Mar. 10, 1992). A need has continued to exist for improved carriers for recreational and similar equipment on the rear of motor vehicles.

SUMMARY OF THE INVENTION

An important aspect of the present invention relates to the discovery that an improved multiple use carrier is provided by the use of three horizontal arms in which two of the arms are aligned in a horizontal plane and the third arm is both located in a plane positioned below the two arms. The invention provides a carrier attachment for a motor vehicle adapted to transport sporting goods such as bicycles or skis on the rear portion of a vehicle, including a frame that supports a plurality of projecting parallel arms. A pair of the arms is positioned in a first plane above the ground, and a third arm is located between the two arms in a plane parallel to and below the first plane. Preferably each of the arms is provided with an encircling sleeve of elastomeric cushioning material having surface indentations to receive an article to be transported, and the cushioning sleeve on at least one of the arms of the upper pair of arms has a flat planar surface portion, and the cushioning layer on the lower arm has a flat plane surface alignable with the first mentioned planar surface so that a flat elongated article such as a ski can be transported in contact with both of the flat planar surface portions. The attachment can be mounted in a trailer hitch receiver tube by means of a bar of rectangular cross-section.

Preferably the arms are carried by a vertically oriented member pivotally attached to the rectangular bar, that is releasably locked in the vertical position. The releasable lock means includes a spring biased pin that is biased into registry with a locking detent carried by the bar.

In accordance with a further aspect of the invention, elastic tie down cords are provided on each arm. In accordance with yet another aspect, means for securing the cords are provided on the ends of the arms and also at an intermediate point on each arm. Such securing means can include loops attached to the arms and the intermediate securing means can include notched discs to which the cords can be secured. Utilizing this tie-down system enables the user to place a bicycle on the carrier, wrap the cord over the bicycle frame, hook the end of the cord on a loop at the end of the support arm, wrap the center of the cord around the center of the arm, and hook the center of the cord on a notch of the disk to easily secure the bicycle in place.

DRAWINGS

The invention will further be set forth in the following detailed description and accompanying drawings wherein:

FIG. 1 is a perspective view of the carrier according to the present invention affixed to a broken away portion of a motor vehicle;

FIG. 2 is a fragmentary perspective view of a portion of a carrier showing a fragmentary portion of a bicycle affixed thereto;

FIG. 3 is a fragmentary side cross-sectional view showing the base portion of a carrier of FIG. 1 with the detent portion shown in detail;

FIG. 4 is a fragmentary rear cross-sectional view of the apparatus shown in FIG. 3;

FIG. 5 is a fragmentary side view showing the apparatus of FIG. 3 in the rearwardly tilted orientation;

FIG. 6 is a fragmentary perspective view of another portion of a support arm of the present invention showing a fragmentary portion of a bicycle frame secured thereto;

FIG. 7 is a rear view of a carrier of the present invention with parts shown in cross-section and with a ski mounted thereon;

FIG. 8 is a perspective view of a further embodiment of the present invention illustrated as being attached to a fragmentary portion of the rear of a motor vehicle;

FIG. 9 is a rear fragmentary view of the carrier of FIG. 8;

FIG. 10 is a side view of the carrier of FIG. 8 illustrating the attachment thereto of bicycles in phantom;

DETAILED DESCRIPTION

Figure 11:
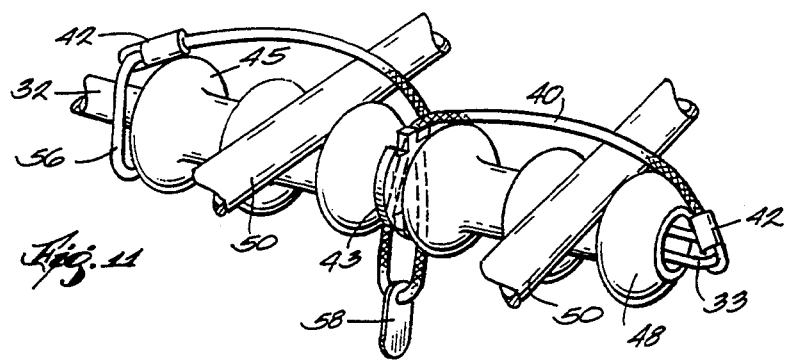
FIG. 11 is a fragmentary perspective view showing two bicycle frames on a carrier of the invention with an elastic tie-down cord loosely hooked thereover.

Referring more particularly to the drawings, a carrier 10 is provided for carrying thereon of sporting goods such as bicycles or skis. Carrier 10 is supported on a tubular square-configured frame element 12 adapted to slide into a square-configured hitch receiver 14 to which it is attached by means of a removable pin 15. Hitch receiver 14 is attached to the rear of a motor vehicle 16 in accordance with conventional practice.

Integral with supporting member 12 is an upwardly facing U-shaped bracket 18 which is preferably welded to member 12. An arm member 20 is pivotally attached to bracket 18 by means of pin 22. Arm member 20 carries integrally attached housing member 24. A removable pin 25 is preferably fitted through aligned holes in bracket 18 and member 20 to act as a further safeguard against downward pivoting of member 20 while the vehicle is in motion. Housing 24 carries two upwardly extending frame elements 26 and 28. A latch release arm 29, the function of which will be explained later, also extends upwardly and forwardly from housing 24. The upper ends of frame members 26 and 28 can be bent as indicated to form support arms 30 and 32 for carrying of cargo such as sporting goods. Optionally arms 30 and 32 can be separate components rather than being formed integrally with members 26 and 28. Arms 30 and 32 are provided with loops 31 and 33 at the ends thereof, respectively, for purposes of attachment of a hook or lock thereto to assist in securing the cargo. In the embodiment of FIG. 1, arm 30 is provided with elastomeric sleeves 34 and 36 and an intermediate washer 35. Similarly, arm 32 is provided with elastomeric sleeves 38 and 39 and intermediate washer 37. Tie down cords 40 provided with end hooks 42 can be used to secure sporting goods on the carrier. Washers 35 and 37 are provided with notches 43 which provide a convenient means for securing intermediate portions of cord 40 to the support arms to further assist in attaching the cargo thereto. Use of notches 43 is illustrated in FIG. 6 wherein a bicycle frame component 50 is secured on elastomeric sleeve 39 by means of cord 40.

As further seen in FIG. 1, an additional arm 44 is attached to the carrier frame in an orientation parallel to arms 30 and 32. As noted, arms 30 and 32 are in a horizontal plane and arm 44 is located between arms 30 and 32 and is located in a horizontal plane beneath that of arms 30 and 32. Arm 44 can be secured to the rack by means of a bracket 46. As further seen in FIG. 1, arm 44 is also provided with elastomeric sleeves 45 and 48 along with an intermediate notched washer 49. The end of arm 44 is also provided with a metal loop 47 in order to attach a hook 42 as desired.

Sleeves 34, 36, 45 and 48 are all provided with flat planar areas 41. The flat planar portions of the sleeves on arm 44 can be linearly aligned with those on arm 30 so that an elongated element such as ski 70, shown in FIG. 7, can be attached thereto. As also seen in FIG. 7, a binding 72 on a ski can rest on sleeve 45 to prevent the ski 70 from sliding downward off of the carrier.

To further assist in securing an article, sporting goods such as a bicycle 50 on the carrier, a cable can be provided on one of the arms as illustrated in FIG. 2. The end of cable 52 can be threaded through one of the metal loops, for example, 33 and if provided with an eyelet 53, can be locked in place by means of a padlock 54.

FIGS. 3 through 5 illustrate a mechanism whereby the carrier 10 can be pivoted downwardly and rearwardly around pivot pin 22 to provide access to the rear of the vehicle. As noted, the bottom of lever arm 29 is provided with a T-shaped end 60 around which one end of a coil spring 62 can be attached. The opposite end of spring 62 is secured to a notch 64 in the forward wall of tubular frame 20. The opposite ends of T-shaped component 60 are urged downwardly by spring 62 to engage a notch or detent 65 in each side of U-shaped member 18. The carrier can be pivoted rearwardly as seen in FIG. 5 by pulling lever 29 upwardly to release the T-shaped end 60 from notch 65. The carrier is then repositioned in the vertical position as desired by pushing the same forwardly. A sloping section 66 is preferably provided on the upper rear corner of each side of member 18 to form a cam surface over which the T-shaped end 60 will ride upwardly.

Additional metal loops 56 can be attached to the support arms of the carrier as desired to provide a means for securement of additional end loops 42 of cords 40.

FIGS. 9 and 10 show the attachment of two bicycles to carrier 10 which in that embodiment is intended to carry two bicycles on the rearwardly extending arms. As best seen in FIG. 10, the lower arm 44 with the elastomeric sleeves 45 and 48 provides a means for securing the lower part of the bicycles to the carrier to prevent swaying of the bicycles as the vehicle starts and stops. This arrangement assists in preventing damage to both the vehicle and the bicycles.

As seen in FIG. 1, additional arms 75 and 76 which extend from a V-shaped central member 74 can be bolted to the forward side of uprights 26 and 28. The arrangement in FIG. 1 permits carrying of as many as four bicycles on the carrier. Arms 75 and 76 have loops 73 and 77 on the ends thereof for attachment of the hooked ends 42 of cords 40. Elastomeric sleeves similar to those on the rearwardly facing arms are also provided as indicated. Like parts are indicated by the same numerals. An additional arm 78 can be attached to one of the uprights 28 by means of a bracket 80. Arm 78 terminates in a metal loop 79. Each of the arms 75, 76 and 78 can be provided with additional loops 56 and notched washers 35, 37 and 49.

In the alternate embodiment shown in FIG. 8, the upper ends of uprights 26 and 28 are secured to a horizontal cross beam 85. A multiple bicycle carrier is provided by means of rearwardly and forwardly extending article carrying arms attached to brackets 86 and 88 which are affixed to the opposite end of cross beam 85. Brackets 86 and 88 secure arms 90, 92, 94 and 96 in place. Each of these arms is provided with an elastomeric sleeve 98. Each of the sleeves 98 is provided with notches as shown for the purpose of receiving frame portions of a bicycle or similar sporting goods. The embodiment of FIG. 8 thus provides a carrier that can be rearwardly pivoted by pulling upward on lever 29 after pin 25 has been removed.

Figure 12:
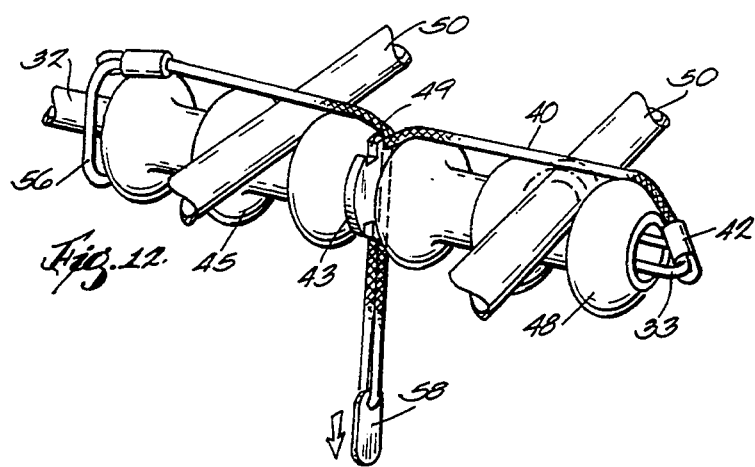
FIGS. 12 and 13 are perspective views of the fragmentary view of FIG. 11 showing further steps in the securement of the elastic cords around the carrier arm.
Figure 13:
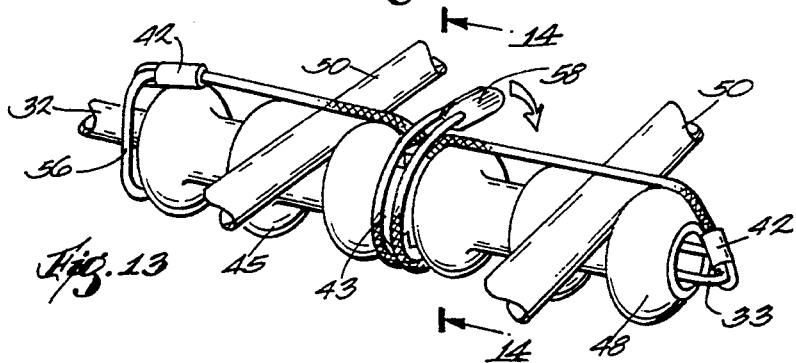
Figure 14:
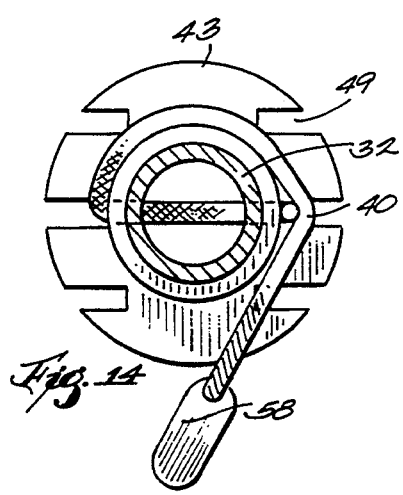
FIG. 14 is a cross-sectional view taken along line 14—14 of FIG. 13.
Figure 15:
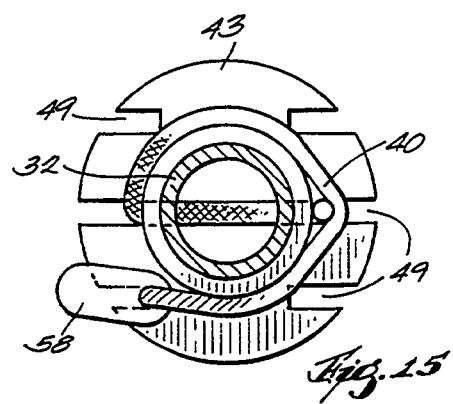
FIG. 15 is a cross-sectional view taken along line 14—14 of FIG. 13 with the elastic cord fixed in position.

Referring to the embodiment of the elastic cord 40 shown in FIGS. 11-15, it is seen that cord 40 can be threaded through an opening through arm 32 as best seen in FIGS. 14 and 15. Cord 40 is preferably threaded through a clip 58 formed of plastic or the like which then becomes secured over the central part of the cord to act as an aid in wrapping the cord around arm 32.

As seen in FIG. 11, the bicycle frames 50 are placed in indentations on rubber sleeves 45 and 48, respectively. The end clips 42 are then secured to loops 33 and 56. With the cords thus attached clip 58 can be pulled downwardly as seen in FIG. 12 and wrapped around arm 32 as seen in FIG. 13. As seen in FIGS. 14 and 15 grasping the end clip facilitates securing the central portion of cord 40 over one of 10 the notches 49 to thus simultaneously firmly secure both bicycles on the support arm.

While preferred embodiments of the invention have been illustrated herein, it will be apparent to those skilled in the art that various modifications can be made without departing from the spirit of the invention.

What is claimed is:

1. A carrier attachment for a motor vehicle comprising:
   a frame member adapted for attachment to the vehicles,
   a plurality of support arms attached to and projecting from said frame member,
   cushioning material associated with at least one of said arms having at least one surface indentation to receive an article to be transported, and
   cushioning material associated with at least one of said arms having at least one flat surface portion adapted to facilitate attachment of a flat article to be transported;
   wherein said plurality of arms includes a pair of upper arms positioned in a first plane, and a lower arm located between said pair of upper arms in a plane parallel to and below said first plane;
   wherein said lower arm and at least one of said upper arms are encircled by said cushioning material having at least one flat surface portion such that the flat surface portions are alignable so that a flat elongated article can be transported in contact with both of said flat surface portions.

2. A carrier attachment for a motor vehicle comprising:
   means for removably mounting the attachment on the rear portion of a vehicle,
   a frame attached to said means,
   a plurality of arms attached to and projecting from said frame, including a pair of upper arms positioned in a first plane above the ground, and a lower arm located between said upper arms in a plane parallel to and below said first plane, wherein each of said upper and lower arms is provided with an encircling layer of cushioning material having surface indentations to receive an article to be transported,
   the cushioning layer on at least one of the upper arms having a flat planar surface portion,
   the cushioning layer on said lower arm having a flat planar surface alignable with said flat planar surfaces of said upper arm so that a flat elongated article can be transported in contact with both of said flat planar surface portions.

3. A carrier attachment for a motor vehicle comprising:
   a frame member adapted for attachment to the vehicle,
   a plurality of support arms attached to and projecting from said frame member, including a pair of upper arms positioned in a first plane, and a lower arm located between said pair of upper arms in a plane parallel to and below said first plane,
   wherein at least one of said plurality of support arms is associated with a cushioning material having at least one surface indentation adapted to receive an article to be transported, and at least one flat surface adapted to facilitate attachment of a flat elongated article to be transported; and
   at least one flexible tie-down member attached to said carrier, said tie-down member having an end hook; and at least one loop associated with a support arm for receiving said end hook;
   a washer located on the support arm that is associated with said loop, wherein said washer includes at least one notch along its perimeter to facilitate securing intermediate portions of said tie-down member to said support arm.

4. An attachment according to claim 3 wherein said tie-down member is threaded though a clip that is adapted to secure a central part of said tie-down member to said washer.

* * * * *

UNITED STATES PATENT AND TRADEMARK OFFICE
CERTIFICATE OF CORRECTION

PATENT NO. : 5,373,978
DATED : December 20, 1994
INVENTOR(S) : Brian Buttchen et al.

It is certified that error appears in the above-indentified patent and that said Letters Patent is hereby corrected as shown below:

Title page, item [57]
<u>In the Abstract</u>

In line 21 delete "is".

In line 21 delete "vertically" and substitute --vertical--.

Col. 5, In claim 1, lines 3-4, delete "vehicles" and substitute --vehicle--.

Col. 6, In claim 4, line 2, delete "though" and substitute --through--.

Signed and Sealed this

Twenty-sixth Day of September, 1995

Attest:

BRUCE LEHMAN

Attesting Officer

Commissioner of Patents and Trademarks